US012811927B2

(12) United States Patent
Zhang et al.

(10) Patent No.: US 12,811,927 B2
(45) Date of Patent: Nov. 24, 2026

(54) THERMOSTAT WITH A PLURALITY OF RANKED LEVELS OF ACCESS CONTROL

(71) Applicant: Honeywell International Inc., Charlotte, NC (US)

(72) Inventors: Ji Zhang, Shanghai (CN); Zhiguo Di, Shanghai (CN); Yidan Zhao, Shanghai (CN); Foong Chan, Petaling Jaya (MY); Kristine Lichtscheidl, St. Francis, MN (US); Ashu Rawat, Redmond, WA (US); Gutha Stalin Sanghamitra, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 16 days.

(21) Appl. No.: 18/770,638

(22) Filed: Jul. 11, 2024

(65) Prior Publication Data

US 2024/0372853 A1 Nov. 7, 2024

Related U.S. Application Data

(63) Continuation of application No. 17/337,112, filed on Jun. 2, 2021, now abandoned.

(60) Provisional application No. 63/042,450, filed on Jun. 22, 2020.

(51) Int. Cl.
*H04L 9/40* (2022.01)
*F24F 11/523* (2018.01)

(52) U.S. Cl.
CPC .......... *H04L 63/083* (2013.01); *F24F 11/523* (2018.01); *H04L 63/102* (2013.01); *H04L 63/105* (2013.01)

(58) Field of Classification Search
CPC ... H04L 63/083; H04L 63/102; H04L 63/105; F24F 11/523; G06F 21/629
See application file for complete search history.

(56) References Cited

U.S. PATENT DOCUMENTS

| | | | | |
|---|---|---|---|---|
| 6,644,557 | B1 * | 11/2003 | Jacobs | F24F 11/30 726/16 |
| 7,003,378 | B2 | 2/2006 | Poth | |
| 8,167,216 | B2 | 5/2012 | Schultz et al. | |
| 8,694,164 | B2 | 4/2014 | Grohman et al. | |
| 8,701,210 | B2 | 4/2014 | Cheng et al. | |
| 8,843,239 | B2 | 9/2014 | Mighdoll et al. | |

(Continued)

OTHER PUBLICATIONS

Building Automation System in Michigan, Johnson Heating and Cooling, L.L.C., www.cooljohnson.com/Building-Automation-Systems-Michigan/Macomb-County-Michigan/Building-Automation-Confidential-Customer.html, 4 pages, Accessed Nov. 21, 2022.

(Continued)

*Primary Examiner* — Jahangir Kabir
(74) *Attorney, Agent, or Firm* — Seager, Tufte & Wickhem, LLP

(57) ABSTRACT

A system and method for configuring an HVAC thermostat provides multiple users of varying rank with different levels of permission to access different sets of thermostat functions. The thermostat distinguishes users by the passcodes they enter. In some examples, a cascade hierarchy enables multiple levels of higher ranking users to limit the function accessibility of lower ranking users. In some examples, higher ranking users determine which home screen is presented to users that do not enter a passcode.

20 Claims, 16 Drawing Sheets

(56) References Cited

U.S. PATENT DOCUMENTS

| | | | | |
|---|---|---|---|---|
| 9,256,230 | B2 | 2/2016 | Matsuoka et al. | |
| 9,447,985 | B2 | 9/2016 | Johnson, Jr. | |
| 10,747,242 | B2 * | 8/2020 | Sloo | G05D 23/19 |
| 10,871,756 | B2 | 12/2020 | Johnson, Jr. et al. | |
| 10,908,578 | B2 | 2/2021 | Johnson, Jr. et al. | |
| 10,921,768 | B2 | 2/2021 | Johnson, Jr. et al. | |
| 11,156,978 | B2 | 10/2021 | Johnson, Jr. et al. | |
| 2009/0089886 | A1 | 4/2009 | Cheng | |
| 2012/0084734 | A1 | 4/2012 | Wilairat | |
| 2012/0310418 | A1 | 12/2012 | Harrod et al. | |
| 2015/0094865 | A1 | 4/2015 | Choi et al. | |
| 2016/0061473 | A1 | 3/2016 | Johnson, Jr. | |
| 2018/0267701 | A1 | 9/2018 | Rigg et al. | |
| 2018/0288213 | A1 | 10/2018 | Bjontegard | |
| 2020/0256571 | A1 | 8/2020 | Johnson, Jr. et al. | |
| 2021/0356927 | A1 | 11/2021 | Johnson, Jr. et al. | |

OTHER PUBLICATIONS

Building Automation System Waterford Michigan 48328 JLA, Johnson Heating and Cooling L.L.C., www.cooljohnson.com/Building-Automation-Systems-Michigan/Waterford-Michigan/Building-Automation-System—JLA.html, 3 pages, Accessed Nov. 21, 2022.

Building Automation Systems Waterford Michigan 48330 SJMO, Johnson Heating and Cooling, L.L.C., www.cooljohnson.com/Building-Automation-Systems-Michigan/Waterford-Michigan/Building-Automation-Systems-SJMO.html, 2 pages, Accessed Nov. 21, 2022.

Building Automation Systems Waterford Michigan 48329 WIM, Johnson Heating and Cooling L.L.C., www.cooljohnson.com/Building-Automation-Systems-Michigan/Building-Automation-Systems-WIM.html, 3 pages, accessed Nov. 21, 2022.

Building Automation Clawson Michigan 2.0, Johnson Heating and Cooling L.L.C., www.cooljohnson.com/Building-Automation-Systems-Michigan/Clawson-Michigan/Building-Automation-Clawson-Manor-2.html, 6 pages, Accessed Nov. 21, 2022.

Building Automation in Detroit—Mosaic Christian, Johnson Heating and Cooling L.L.C., www.cooljohnsoncom/Building-Automation-Systems-Michigan/Detroit/Mosaic-Christian.html, 5 pages, Accessed Nov. 21, 2022.

Building Automation in Michigan—Divine Grace, Johnson Heating and Cooling L.L.C., www.cooljohnson.com/Building-Automation-Systems-Michigan/Oakland-County-Michigan/Building-Automation-Divine-Grace.html, 3 pages, Accessed Nov. 21, 2022.

Building Automation System Plymouth, Michigan, Johnson Heating and Cooling L.L.C., www.cooljohnson.com/Building-Automation-Systems-Michigan/Plymouth-Michigan/Building-Automation-System-Plymouth-Michigan.html, 8 pages, Accessed Nov. 21, 2022.

Building Automation Systems Shelby Michigan 48316 SG, Johnson Heating and Cooling L.L.C., www.cooljohnson.com/Building-Automation-Systems-Michigan/Shelby-Township-Michigan/Building-Automation-Systems-SG.html, 3 pages, Accessed Nov. 21, 2022.

Building Automation System St. Clair County, Michigan, Johnson Heating and Cooling L.L.C., www.cooljohnson.com/building-Automation-Systems-Michigan/St-Clair-Michigan/Building-Automation-system-St-Clair-Michigan.html, 4 pages, Accessed Nov. 21, 2022.

Building Automation System Troy Michigan Oakland Mall, Johnson Heating and Cooling L.L.C., www.cooljohnson.com/Building-Automation-Systems-Michigan/Troy Michigan/Building-Automation-System-Oakland-Mall.html, 4 pages, Accessed Nov. 21, 2022.

Building Automation System Waterford Michigan 48327 Excel, Johnson Heating and Cooling L.L.C., www.cooljohnson.com/Building-Automation-Systems-Michigan/Waterford-Michigan/Building-Automation-System—excel.html, 2 pages, Accessed Nov. 22, 2022.

Building Automation System Romeo Michigan 48065 RomeoPR, Johnson Heating and Cooling, L.L.C., www.cooljohnson.com/Building-Automation-Systems-Michigan/Romeo-Michigan/Building-Automation-System-RomeoPR.html, 2 pages, Accessed Nov. 21, 2022.

Johnson, Jr., "Cooling Logic™: Changing the Way You Cool," Johnson Solid State, LLC, 12 pages, Nov. 7, 2018.

Building Automation System Clawson Michigan Clawson Manor, Johnson Heating and Cooling L.L.C., www.cooljohnson.com/building-Automation-Systems-michigan/clawson-Michigan/building-Automation-System-Clawson-Manor.html, 3 pages, Accessed Nov. 21, 2022.

Johnson, Jr., "CoolingLogic™A Method to increase HVAC System Efficiency And Decrease Energy Consumption," A White Paper, Johnson Solid State, L.L.C., 51 pages, Sep. 24, 2016.

Johnson, Jr., "CoolingLogic™: Mosaic Christian Church A Case Study," 140 pages, Feb. 2, 2019.

Screen Sequence to Add Lock Screen with Passcode. Snapshots taken on Jun. 5, 2020 from Youtube video at: https://www.youtube.com/watch?v=u4Gcfjne4yM.

"Home Kit Thermostat Offers a Large Color Display and Easy Setup," by AppleAdmin, Sep. 6, 2017, 10 pages.

"Nest Thermostat app-for sharing access to Nest home," Silverbytes, 7 pages, 2019.

* cited by examiner

FIG. 34

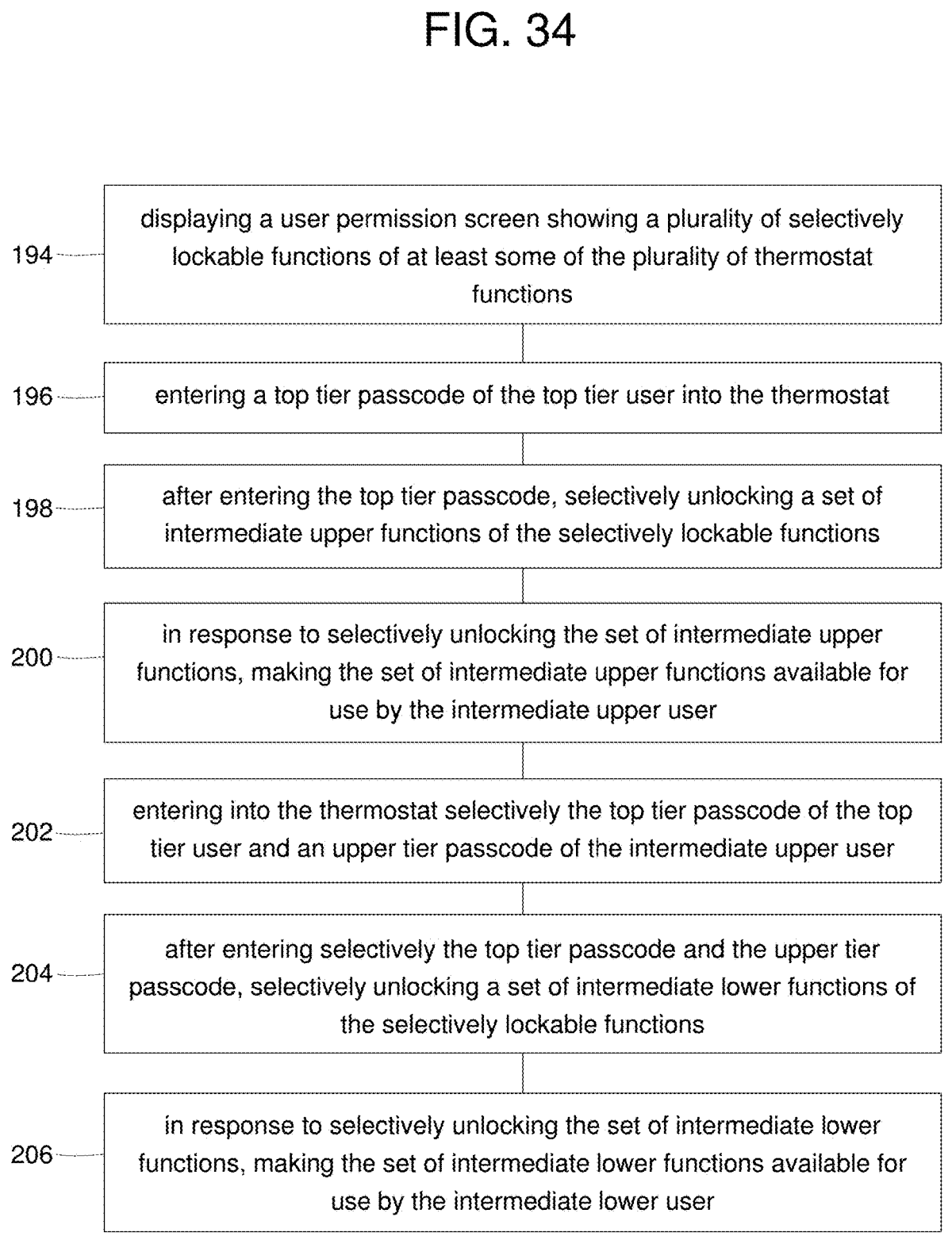

194 — displaying a user permission screen showing a plurality of selectively lockable functions of at least some of the plurality of thermostat functions 196 — entering a top tier passcode of the top tier user into the thermostat 198 — after entering the top tier passcode, selectively unlocking a set of intermediate upper functions of the selectively lockable functions 200 — in response to selectively unlocking the set of intermediate upper functions, making the set of intermediate upper functions available for use by the intermediate upper user 202 — entering into the thermostat selectively the top tier passcode of the top tier user and an upper tier passcode of the intermediate upper user 204 — after entering selectively the top tier passcode and the upper tier passcode, selectively unlocking a set of intermediate lower functions of the selectively lockable functions 206 — in response to selectively unlocking the set of intermediate lower functions, making the set of intermediate lower functions available for use by the intermediate lower user

THERMOSTAT WITH A PLURALITY OF RANKED LEVELS OF ACCESS CONTROL

This is a continuation of co-pending U.S. patent application Ser. No. 17/337,112, filed Jun. 2, 2021, which claims the benefit of U.S. Provisional Application No. 63/042,450, filed Jun. 22, 2020, which is hereby incorporated by reference.

TECHNICAL FIELD

The disclosure relates generally to thermostats and more particularly to user interfaces of thermostats.

BACKGROUND

Heating, Ventilating and/or Air Conditioning (HVAC) systems condition the air of homes, buildings and facilities. Example HVAC systems include air conditioners, rooftop units, air handling units, humidifiers, dehumidifiers, heat pumps, furnaces, boilers, dampers and ductwork, and various combinations thereof. Thermostats are used to help control an HVAC system in response to feedback from various sensors that measure temperature, pressure, humidity and/or other parameters. Thermostats usually include a user interface for enabling users to monitor air conditions, check the operating status of the HVAC system, changing thermostat settings and configure the thermostat.

Some thermostats require a user to enter a passcode in order to access certain thermostat functions and settings. A system installer or technician, for example, might be required to enter a passcode for accessing normally restricted HVAC configuration settings that if set improperly could damage the HVAC equipment. Requiring the use of a passcode can help prevent less skilled end users from making detrimental changes to their system.

SUMMARY

The present disclosure generally pertains to a system and method for configuring an HVAC thermostat by providing multiple users of varying rank with different levels of permission to access different sets of thermostat functions. The thermostat distinguishes users by the passcodes they enter. In some examples, a cascade hierarchy enables multiple levels of higher ranking users to limit the function accessibility of lower ranking users. In some examples, higher ranking users determine which home screen is presented to users that do not enter a passcode In some examples of the disclosure, a method for controlling access to a plurality of functions of a thermostat includes a user interface of the thermostat providing access to a basic set of functions of the plurality of functions without receiving a passcode via the thermostat's user interface. The user interface provides a lower tier set of functions of the thermostat in response to the user interface receiving a lower tier passcode. The user interface provides an upper tier set of functions of the thermostat in response to the user interface receiving an upper tier passcode. The lower tier set of functions of the thermostat includes the basic set of functions plus one or more other functions. The upper tier set of functions of the thermostat includes the basic set of functions, the lower tier set of functions plus one or more other functions. The HVAC system is provided with control signals that are based at least partially on one or more thermostat settings set by one or more of the plurality of functions of the thermostat.

In some examples of the disclosure, a thermostat includes a housing that houses a user interface and a controller having a plurality of functions. The controller is operatively coupled to the user interface. The controller is configured to have the user interface provide access to a basic set of functions of the plurality of functions without the user interface receiving a passcode. The user interface provides a lower tier set of functions of the plurality of functions in response to receiving a lower tier passcode. The user interface provides an upper tier set of functions of the plurality of functions in response to receiving an upper tier passcode. The lower tier set of functions of the thermostat includes the basic set of functions plus one or more other functions. The upper tier set of functions of the thermostat includes the basic set of functions, the lower tier set of functions plus one or more other functions. The HVAC system is provided with control signals that are based at least partially on one or more thermostat settings set by one or more of the plurality of functions of the thermostat.

Some examples of the disclosure include a non-transitory computer readable medium having stored thereon software instructions that, when executed by a processor of a thermostat, cause the processor to provide access to a basic set of functions of a plurality of functions of the thermostat. The access to the basic set of functions is provided through a user interface of the thermostat without the user interface receiving a passcode. The user interface provides a lower tier set of functions of the thermostat in response to the user interface receiving a lower tier passcode. The user interface provides an upper tier set of functions of the thermostat in response to the user interface receiving an upper tier passcode. The lower tier set of functions of the thermostat includes one or more functions not part of the basic set of functions. The upper tier set of functions of the thermostat includes one or more functions not part of the basic set of functions and the lower tier set of functions. The HVAC system is provided with control signals that are based at least partially on one or more thermostat settings set by one or more of the plurality of functions of the thermostat.

The preceding summary is provided to facilitate an understanding of some of the features of the present disclosure and is not intended to be a full description. A full appreciation of the disclosure can be gained by taking the entire specification, claims, drawings and abstract as a whole.

BRIEF DESCRIPTION OF THE DRAWINGS

The disclosure may be more completely understood in consideration of the following description of various illustrative embodiments of the disclosure in connection with the accompanying drawings in which:

FIG. 34 is a flow diagram illustrating various example method steps associated with some example thermostats.

Figure 1:
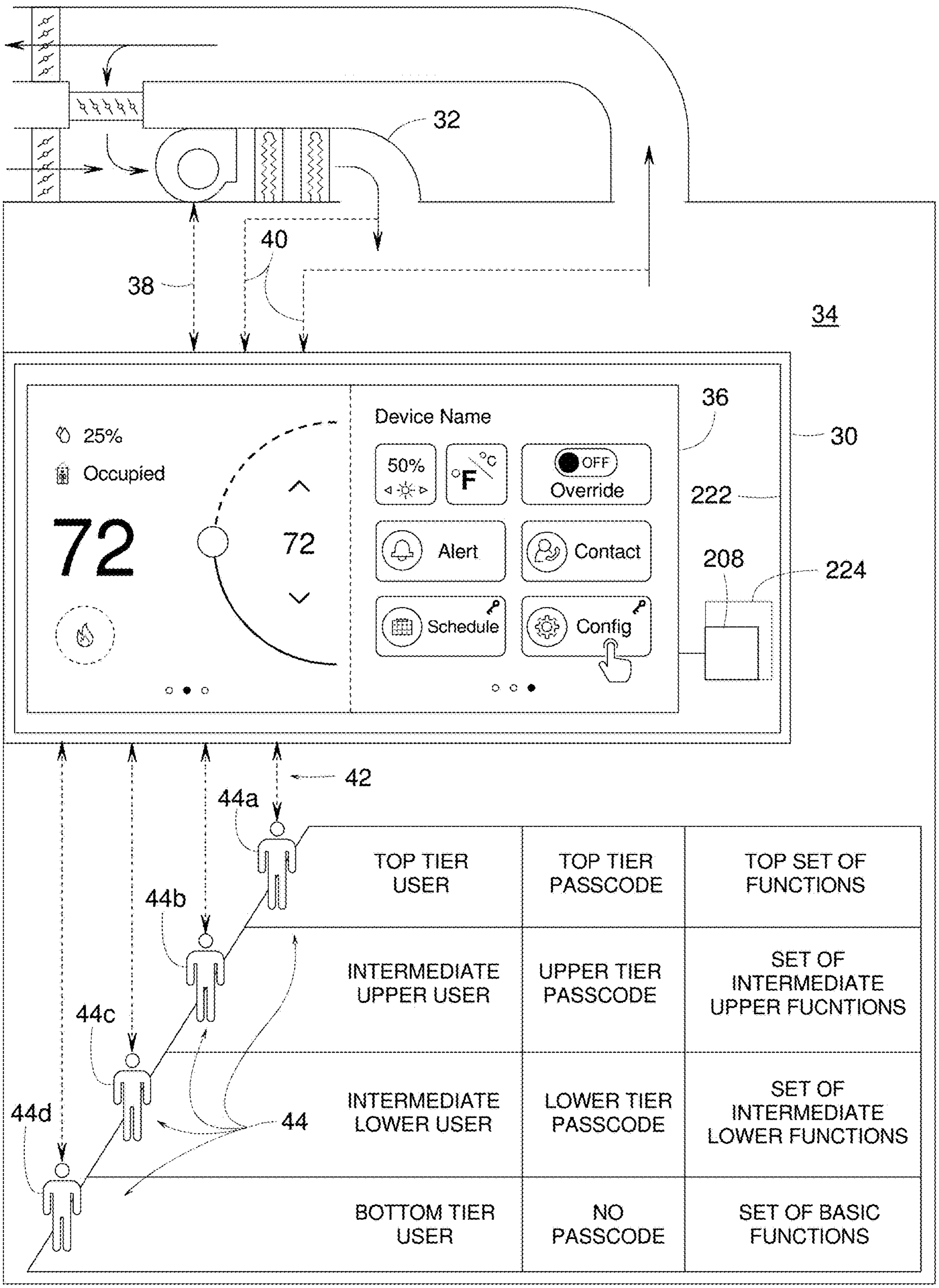
FIG. 1 is a schematic block diagram of an example HVAC system controlled by an example thermostat that responds to users of varying rank.

While the disclosure is amendable to various modifications and alternative forms, specifics thereof have been shown by way of example in the drawings and will be described in detail. It should be understood, however, that the intention is not to limit the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several examples that are meant to be illustrative of the disclosure.

In some examples, the disclosure pertains to a method for assisting a plurality of users in using a thermostat that controls an HVAC system. The users are classified in a rank or hierarchy to provide higher ranking users with access to more thermostat functions than lower ranking users. A user's rank, and thus the user's function accessibility, is based on which passcode a user enters into the thermostat, so different passcodes identify users of different rank. The term, "passcode," refers to a string of letters, numbers and/or symbols used for gaining access to one or more thermostat functions of a thermostat. Some example users, arranged in order of descending rank, include a top tier user (e.g., a thermostat installer), an intermediate upper user (e.g., a store owner or a building manager), a lower tier user (e.g., a department supervisor or an employee), and a bottom tier user (e.g., a visitor or a shopper).

In some examples, a top tier user has access to all of the thermostat functions (e.g., specifying and assigning passcodes, specifying thermostat functions available to lower ranking users, adjusting the temperature setpoint, setting upper and lower temperature setpoint limits, switching between heating and cooling modes, overriding operation of the HVAC system, configuring the HVAC system, etc.). In some examples, an intermediate upper user has access to fewer thermostat functions (e.g., specifying thermostat functions available to lower ranking users, heat/cool scheduling, adjusting the temperature setpoint, setting upper and lower temperature setpoint limits, etc.). In some examples, an intermediate lower user has access to even fewer thermostat functions (e.g., adjusting the temperature setpoint). In some examples, a bottom tier user has the least access to thermostat functions (e.g., being able to merely view the thermostat's display of the actual room temperature, waking the thermostat from a sleep state to display the actual room temperature or a limited home screen).

The term, "thermostat function," refers to anything the thermostat is capable of doing to help monitor the operation of an HVAC system, to help monitor conditions associated with the HVAC system, to help control the operation an HVAC system, and/or to assist a user in operating the thermostat. Some example thermostat functions include displaying a temperature of a comfort zone, displaying the relative humidity of the comfort zone, displaying the outdoor temperature or humidity, displaying a target temperature, enabling a user to adjust the target temperature, displaying the concentration of $CO_2$, indicating whether the HVAC system is in a heating or cooling mode, enabling a user to switch the HVAC system between the heating and cooling mode, configuring the thermostat, enabling a user to enter a passcode, enabling one user to allow or deny another user's access to one or more thermostat functions, enabling one user to specify or change another user's access to certain thermostat functions, enabling a user to specify a temperature conditioning schedule, enabling a user to specify which information is to be displayed on the thermostat, enabling a user to specify which information is not to be displayed on the thermostat, enabling certain screen displays, blocking certain screen displays, unblocking certain screens in response to the user entering a correct passcode, and limiting a user's access in response to the user entering an incorrect passcode. The term, "function accessibility," is a measure of a user's degree of permission to use various thermostat functions.

FIG. 1 is a schematic diagram illustrating one example of a thermostat 30 controlling an example HVAC system 32 used for conditioning the air in a comfort zone 34. HVAC stands for heating, ventilating and air conditioning. The term, "HVAC system," refers to one or more devices for affecting the temperature, humidity and/or ventilation of a comfort zone. Some examples of such devices include an air conditioner, a rooftop unit, an air handling unit, a heat pump, a furnace, a boiler, a heat exchanger, an evaporator, a condenser, a blower, a compressor, a damper, an expansion valve, and various combinations thereof. The term, "comfort zone," refers to any designated room, area or space within one or more buildings. The term, "thermostat," refers to any electronic device for monitoring and/or controlling an HVAC system, wherein the electronic device includes a user interface 36. Some examples of user interface 36 include a touchscreen, a keyboard, a dial, one or more buttons, a display screen, a card reader, and various combinations thereof.

In the illustrated example, control signals 38 are conveyed between thermostat 30 and HVAC system 32. Arrows 40 represent feedback conveyed to thermostat 30 from one or more sensors associated with HVAC system 32 or comfort zone 34. Arrows 42 represent communication between thermostat 30 and a plurality of users 44 (e.g., one or more of a top tier user 44*a*, an intermediate upper user 44*b*, an intermediate lower user 44*c*, a bottom tier user 44*d*, and various combinations thereof). FIG. 1 happens to show thermostat 30 displaying just one of many possible screen displays. Examples of other possibly displayed screens include screens 2-28, shown in FIGS. 2-28, respectively.

Figure 29:
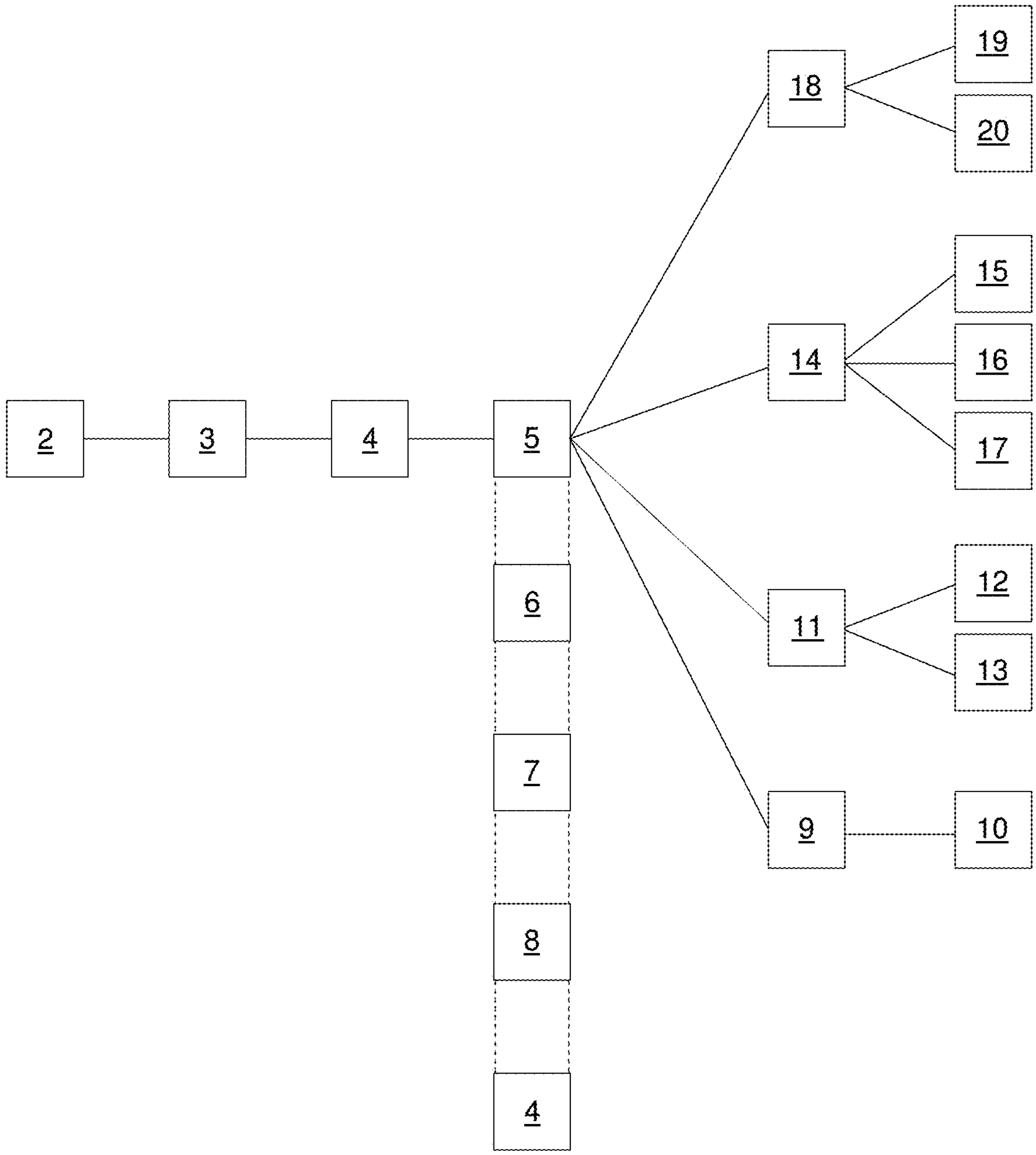
FIG. 29 is a schematic block diagram illustrating an example relationship of some example thermostat screens.
Figure 30:
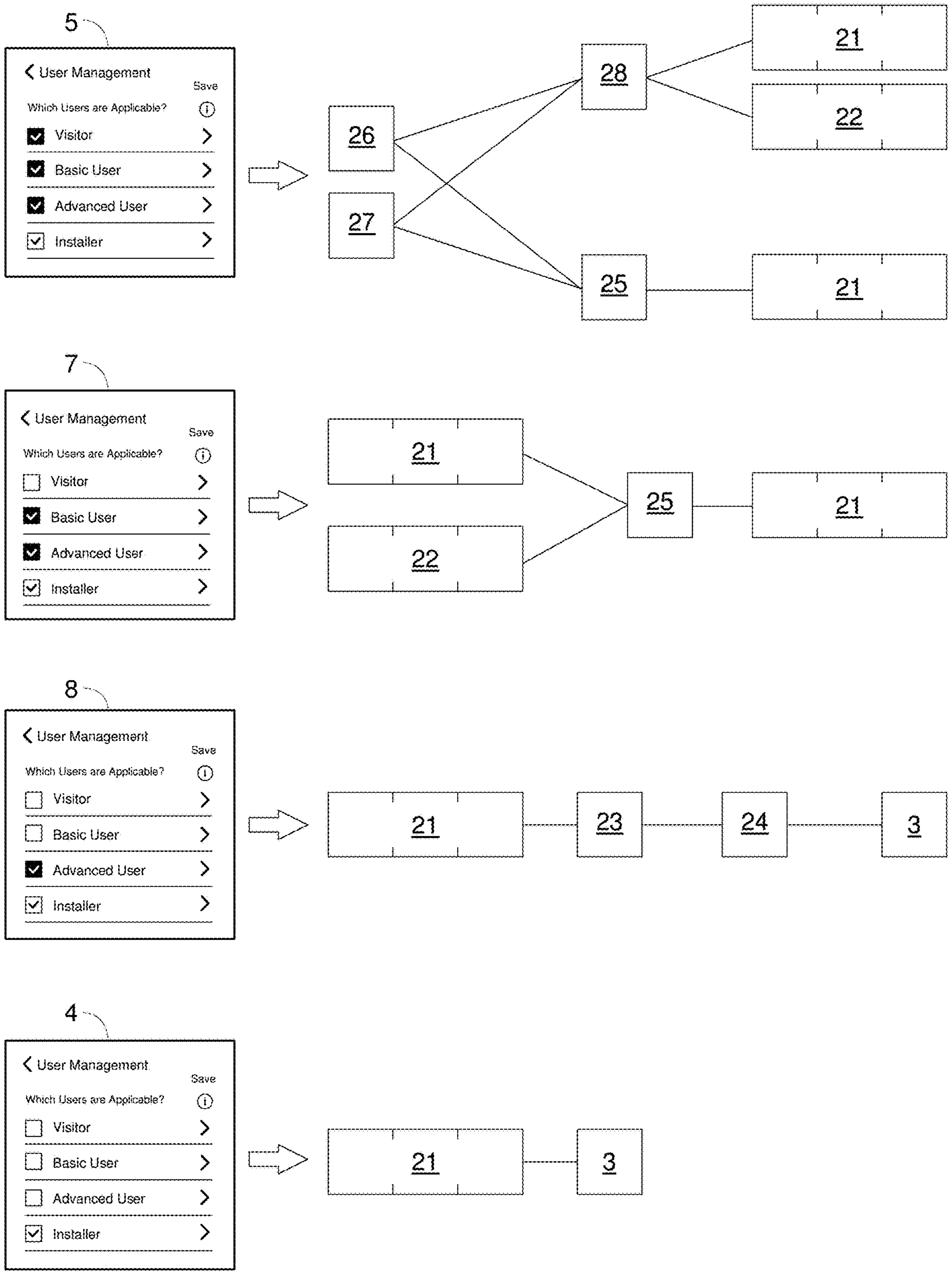
FIG. 30 is a schematic block diagram illustrating another example relationship of some example thermostat screens.

In some examples, screens 2-20 (FIGS. 2-20) are used for assisting top tier user 44*a*, and sometimes other users 44, in configuring thermostat 30 as it relates to HVAC system 32 and users 44. Screens 21-28 (FIGS. 21-28), in some examples, are used during normal operation of HVAC system 32. In some examples, FIG. 29 shows the relationship of screens 2-20 during system configuration, while FIG. 30 shows the relationship of screens 21-28 during normal operation.

One example sequence of configuring thermostat 30 may begin with screen 2. Of the various options displayed in screen 2, top tier user 44*a* may select a Configure button 46, which leads to thermostat 30 displaying screen 3. In screen 3, top tier user 44*a* may select a User Management option 48, which leads to thermostat 30 displaying screen 4.

In screen 4, top tier user 44*a* may select one or more checkboxes 50 (e.g., checkbox 50*a*, 50*b*, 50*c* and/or 50*d*) to designate which one or more users 44 are applicable. In some examples, checkbox 50*a* is checked by default because certainly at least one user 44 should be set up to use thermostat 30. In addition to default checkbox 50*a*, top tier user 44*a* can select any combination of additional checkboxes 50*b*, 50*c* and 50*d*. Some example combinations include screens 5, 6, 7 and 8; which are shown in FIGS. 5, 6, 7 and 8, respectively. Screen 5 shows an example where top tier user 44*a* selected checkboxes 50*b*, 50*c* and 50*d*; whereby top tier user 44*a*, intermediate upper user 44*b*, intermediate lower user 44*c* and bottom tier user 44*d* will all be set up to use thermostat 30. Screen 6 shows an example where checkboxes 50*a*, 50*b* and 50*d* having been checked for users 44*a*, 44*b* and 44*d*, respectively. Screen 7 shows an example where checkboxes 50*a*, 50*b* and 50*c* having been checked for users 44*a*, 44*b* and 44*c*, respectively. Screen 8 shows an example where checkboxes 50*a* and 50*b* have been checked for users 44*a* and 44*b*, respectively.

Figure 5:
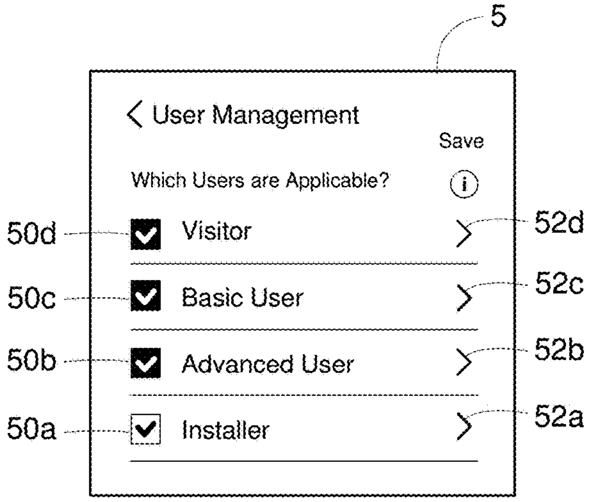
FIG. 5 is a view of another example screen of the thermostat.
Figure 6:
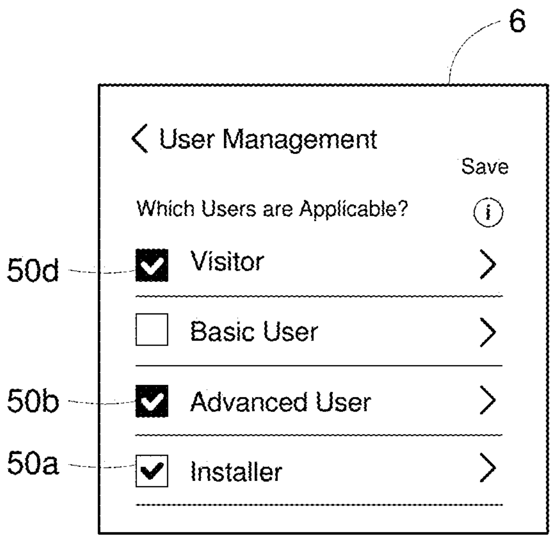
FIG. 6 is a view of another example screen of the thermostat.
Figure 7:
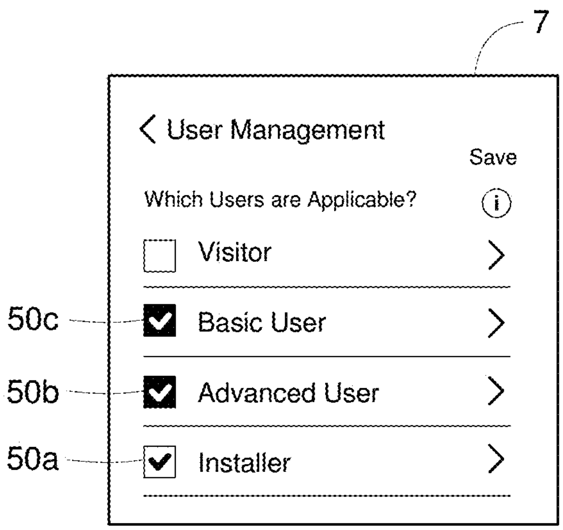
FIG. 7 is a view of another example screen of the thermostat.
Figure 8:
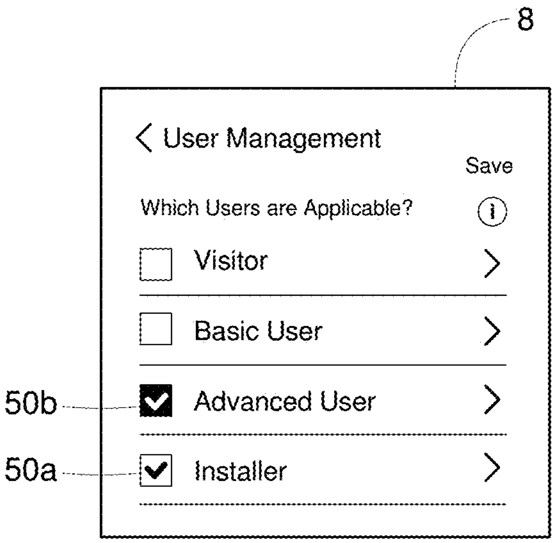
FIG. 8 is a view of another example screen of the thermostat.
Figure 9:
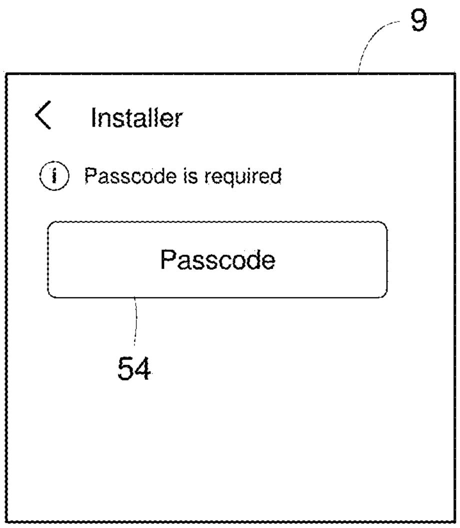
FIG. 9 is a view of another example screen of the thermostat.
Figure 10:
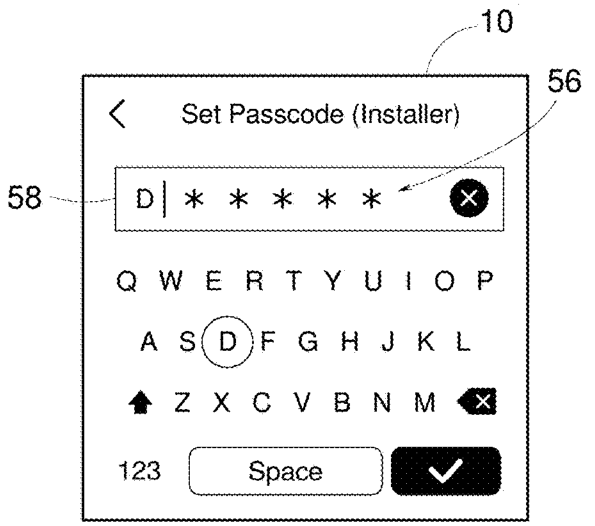
FIGS. 10-11 are views of additional example screen of the thermostat.

In the example shown in FIG. 5, where all four checkboxes 50*a-d* have been selected, top tier user 44*a* can then set things up individually for all four users 44*a-d*. To begin, top tier user 44*a* may select the lowermost greater-than sign 52*a* in screen 5, which leads to screen 9 (FIG. 9). Selecting a Passcode option 54 in screen 9 leads to screen 10. In screen 10, top tier user 44*a* specifies a desired top tier passcode 56 by entering it into a textbox 58.

Figure 11:
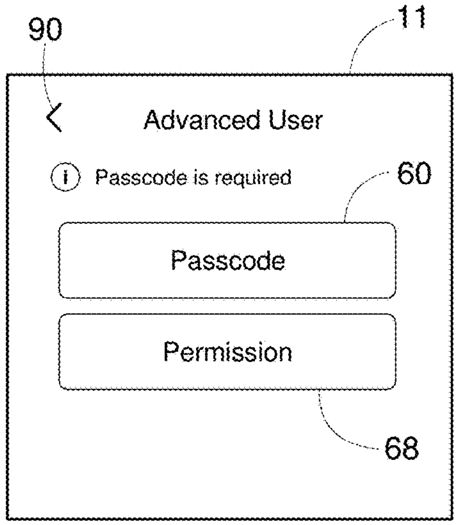
Figure 12:
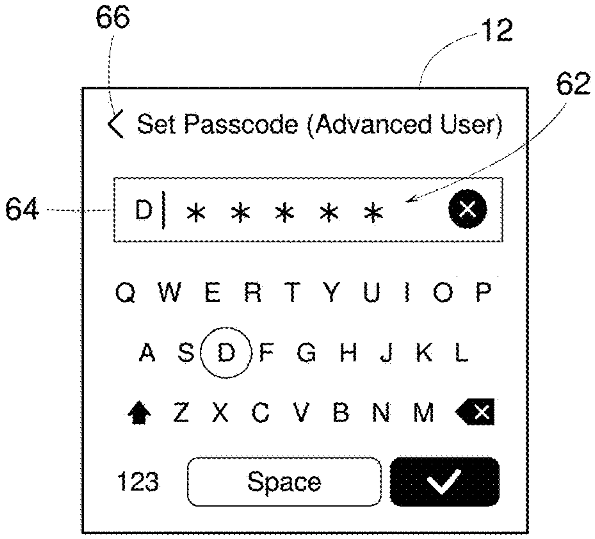
FIG. 12 is a view of another example screen of the thermostat.

After setting up top tier user 44*a*, as just described, top tier user 44*a* might return to screen 5 to begin setting up another user 44, such as intermediate upper user 44*b* (Advanced User). In screen 5, top tier user 44*a* can select another greater-than sign 52*b* (corresponding to intermediate upper user 44*b*), which leads to screen 11 (FIG. 11). Selecting a Passcode option 60 in screen 11 leads to screen 12. In screen 12, top tier user 44*a* specifies a desired upper tier passcode 62 for intermediate upper user 44*b* by entering upper tier passcode 62 into a textbox 64. Top tier user 44*a* needs to tell intermediate upper user 44*b* what the upper tier passcode 62 is, so intermediate upper user 44*b* can later use it to access certain thermostat functions.

Figure 13:
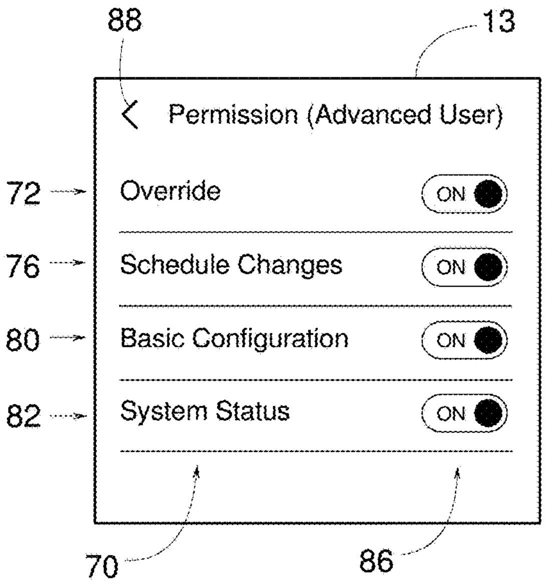
FIG. 13 is a view of another example screen of the thermostat.
Figure 14:
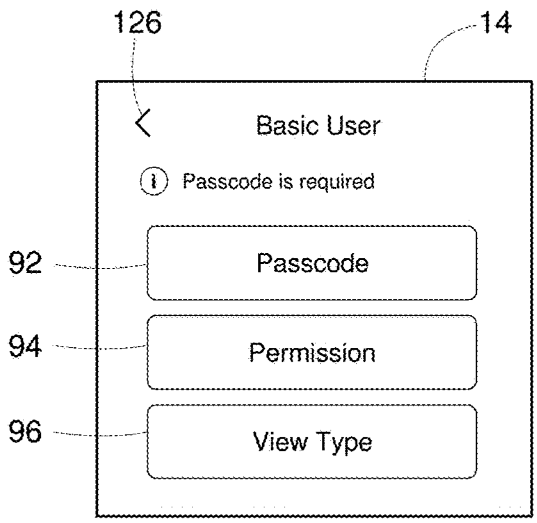
FIG. 14 is a view of another example screen of the thermostat.
Figure 15:
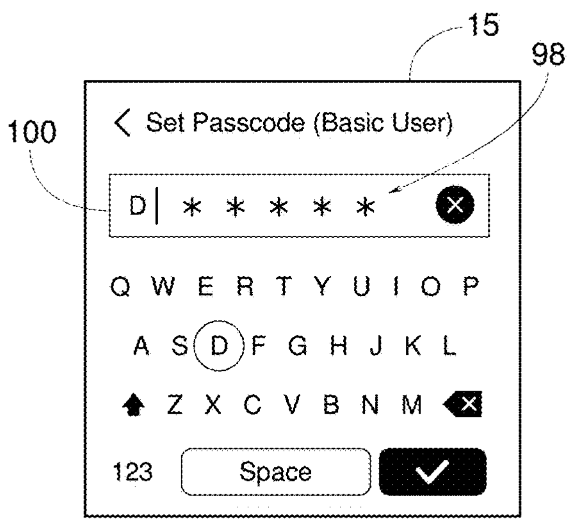
FIG. 15 is a view of another example screen of the thermostat.

After top tier user 44*a* specifies and enters upper tier passcode 64, top tier user 44*a* can return to screen 11 by selecting a less-than sign 66 in the upper left corner of screen 12. Once back at screen 11, top tier user 44*a* can select a Permission option 68, which leads to screen 13. Screen 13 displays a plurality of selectively lockable thermostat functions 70 that can be made available to intermediate upper user 44*b*. Some examples of selectively lockable thermostat functions 70 include an Override 72 for enabling intermediate upper user 44*b* to override certain features of thermostat 30 and/or HVAC system 32 via an override button 74 in screen 2 (FIG. 2), a Schedule Changes 76 for intermediate upper user 44*b* to set or change the HVAC system's schedule via a Schedule button 78 in screen 2, a Basic Configuration 80 for enabling Configuration button 46 in screen 2 to utilize certain options in screen 3, and a System Status 82 enabling a System Status button 84 in screen 3 to display diagnostics and other information pertaining to HVAC system 32. The selectively lockable thermostat functions 70 shown in FIG. 13 are just some examples. Other examples of thermostat 30 have more selectively lockable thermostat functions 70 than those shown in FIG. 13, and other examples have less. Some additional selectively lockable thermostat functions 70 may include a function to set which of a plurality of home screens are made available to select by the basic set of functions, a function to set the predetermined range of set point values, and a function to set which of the plurality of functions of the thermostat are part of the lower tier set of functions. In some examples, screen 13 provides a set of icons 86 that emulate sliding on/off switches. Icons 86 enable top tier user 44*a* to individually lock or unlock the selectively lockable thermostat functions 70 to respectively disallow or allow the intermediate upper user's use of those functions. This completes the process of setting up the intermediate upper user 44*b*.

Next, top tier user 44*a* can navigate back to screen 5 using less-than symbols 88 and 90 in the upper left hand corners of screens 13 and 11, respectively. Once back at screen 5, top tier user 44*a* can begin the set up of intermediate lower user 44*c* by selecting a greater-than symbol 52*c* corresponding to intermediate lower user 44*c* (Basic User). This leads to screen 14, which displays three options: a Passcode option 92, a Permission option 94, and a View Type option 96.

Selecting Passcode option 92 in screen 14 leads to screen 15. In screen 15, top tier user 44*a* specifies a desired lower tier passcode 98 for intermediate lower user 44*c* by entering lower tier passcode 98 into a textbox 100. Someone, of course, needs to tell intermediate lower user 44*c* what the lower tier passcode 98 is, so intermediate lower user 44*c* can later use it to access certain thermostat functions.

Figure 16:
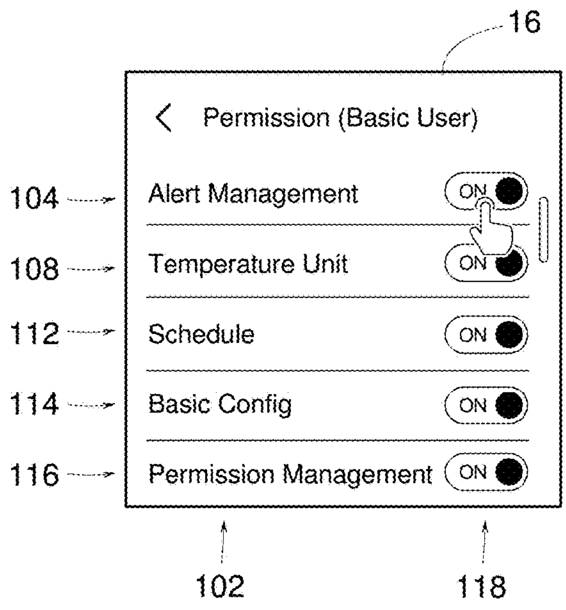
FIG. 16 is a view of another example screen of the thermostat.

Selecting Permission option 94 in screen 14 leads to screen 16. Screen 16 displays a plurality of selectively lockable thermostat functions 102 that top tier user 44*a* can choose to make available to intermediate lower user 44*c*. Some examples of selectively lockable thermostat functions 102 include an Alert Management option 104 enabling the use of an Alert button 106 in screen 2 to send out a notification or an alert signal pertaining to a problem with HVAC system 32, a Temperature Unit option 108 for enabling intermediate lower user 44*c* to use a Units button 110 in screen 2 to switch between units of Fahrenheit and Centigrade, a Schedule option 112 for intermediate lower user 44*c* to set or change the HVAC system's schedule via Schedule button 78 in screen 2, a Basic Configuration option 114 for enabling Configuration button 46 in screen 2 to utilize certain options in screen 3, and a Permission Management option 116 to enable the use of User Management button 48 in screen 3. The selectively lockable thermostat functions 102 shown in FIG. 16 are just some examples. Other examples of thermostat 30 have more selectively lockable thermostat functions 102 than those shown in FIG. 16, and other examples have less. Some additional selectively lockable thermostat functions 102 may include a function for waking up the user interface of the thermostat from a sleep state to view a home screen, a function for changing a home screen that is displayed on the user interface of the thermostat, and a function to change a temperature set point of the thermostat to a set point value within a predetermined range of set point values.

In some examples, screen 16 provides a set of icons 118 that emulate sliding on/off switches. Icons 118 enable top tier user 44*a* to individually lock or unlock the selectively lockable thermostat functions 102 to respectively disallow or allow the intermediate lower user's use of those functions. Once top tier user 44*a* completes this part of the process (Permission option 94), top tier user 44*a* can return to screen 14 to select View Type option 96.

Figure 17:
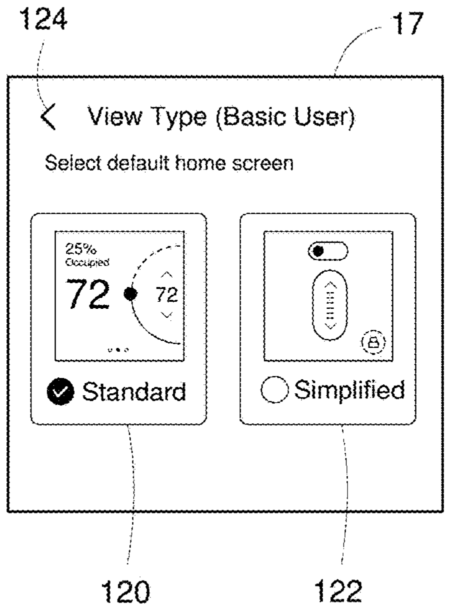
FIG. 17 is a view of another example screen of the thermostat.
Figure 18:
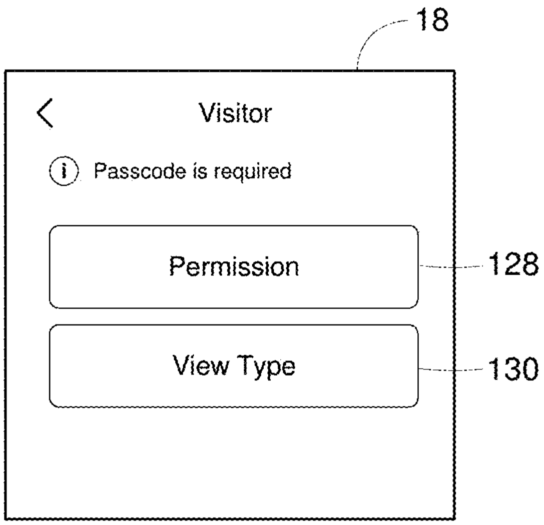
FIG. 18 is a view of another example screen of the thermostat.

Selecting View Type option 96 in screen 14 takes top tier user 44*a* to screen 17 (FIG. 17). In screen 17, top tier user 44*a* can select between a Standard View button 120 or a Simplified View button 122. Buttons 120 and 122 determine which home screen thermostat 30 will display for intermediate lower user 44*c* (Basic User). This completes the process of setting up intermediate lower user 44*c*.

Next, top tier user 44*a* can navigate back to screen 5 using less-than symbols 124 and 126 in the upper left hand corners of screens 17 and 14, respectively. Once in screen 5, top tier user 44*a* can begin the set up of bottom tier user 44*d* by selecting a greater-than symbol 52*a* corresponding to bottom tier user 44*d*. This leads to screen 18, which displays a Permission option 128 and a View Type option 130.

Figure 2:
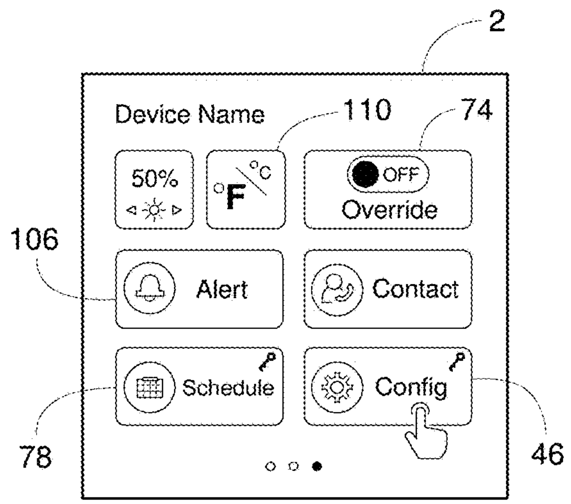
FIG. 2 is a view of one example screen of the thermostat.
Figure 19:
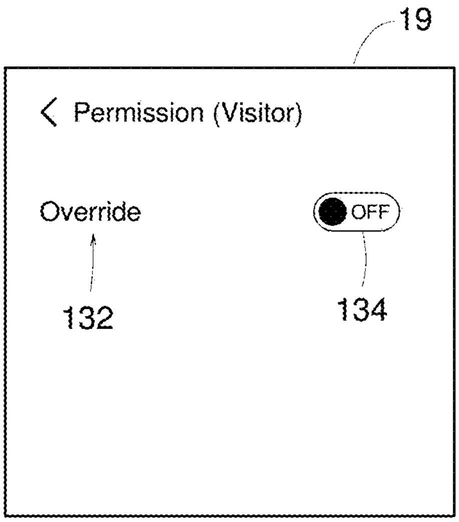
FIG. 19 is a view of another example screen of the thermostat.

Selecting Permission option 128 in screen 18 leads to screen 19. In some examples, screen 19 only provides one selectively lockable thermostat function 132 that top tier user 44*a* can choose to make available to bottom tier user 44*d*. In the illustrated example, the selectively lockable thermostat function 132 is an Override option to enable bottom tier user 44*d* to override certain features of thermostat 30 and/or HVAC system 32 via override button 74 in screen 2 (FIG. 2). The selectively lockable thermostat function 132 shown in FIG. 19 is just one example. Other examples of thermostat 30 have more selectively lockable thermostat functions than the one shown in FIG. 19, and other examples have none. Icon 134 enables top tier user 44*a* to lock or unlock Override option 132 to respectively disallow or allow the bottom tier user's use of this function. Once top tier user 44*a* completes this part of the process (Permission option 128), top tier user 44*a* can use screen 18 to select View Type option 130.

Figure 20:
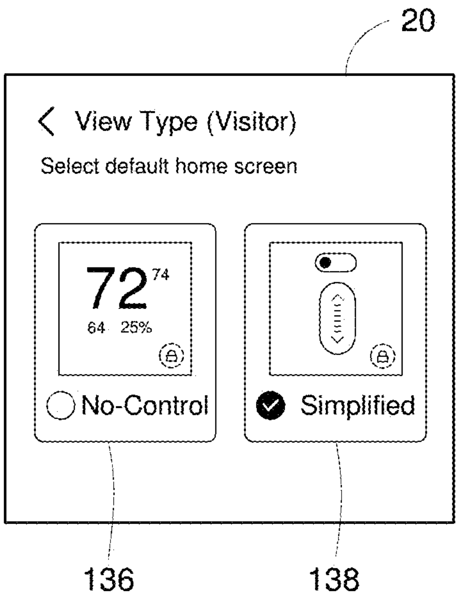
FIG. 20 is a view of another example screen of the thermostat.

Selecting View Type option 130 in screen 18 takes top tier user 44*a* to screen 20 (FIG. 20). In screen 20, top tier user 44*a* can select between a Standard View button 136 or a simplified View button 138. Buttons 120 and 122 determine which home screen thermostat 30 will display for bottom tier user 44*d*. In some examples, this completes the process of setting up bottom tier user 44*d*. Since users 44*a*, 44*b* and 44*c* have already been set up as well, top tier user 44*a* can navigate back to screen 2 (FIG. 2) to place thermostat 30 in a certain operating configuration for controlling HVAC system 32.

Figure 4:
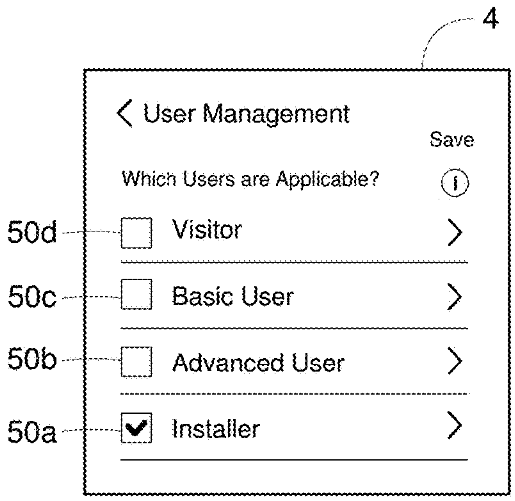
FIG. 4 is a view of another example screen of the thermostat.

The thermostat's actual operating configuration (FIG. 30) depends on which combination of User Management choices top tier user 44*a* selected in screen 4 (FIG. 4). Some example possible combinations are displayed in screens 4, 5, 6, 7 and 8; which are shown in FIGS. 4, 5, 6, 7 and 8; respectively. Screen 4 is the default selection.

Figure 21:
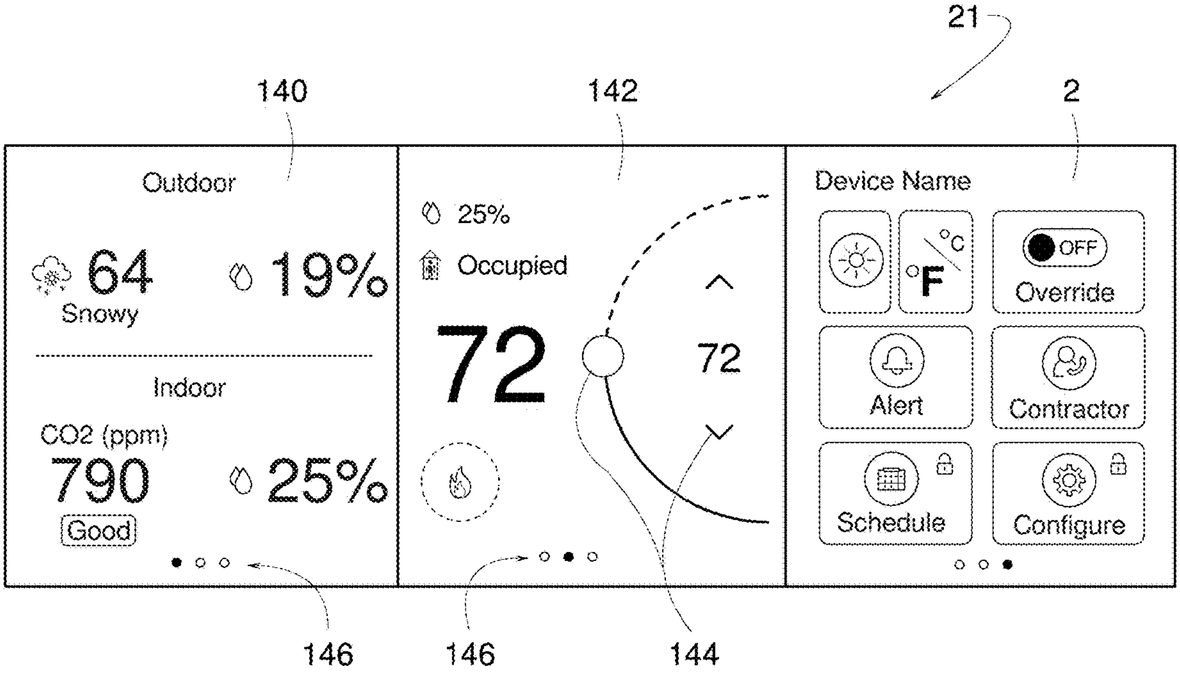
FIG. 21 is a view of another example screen of the thermostat.
Figure 22:
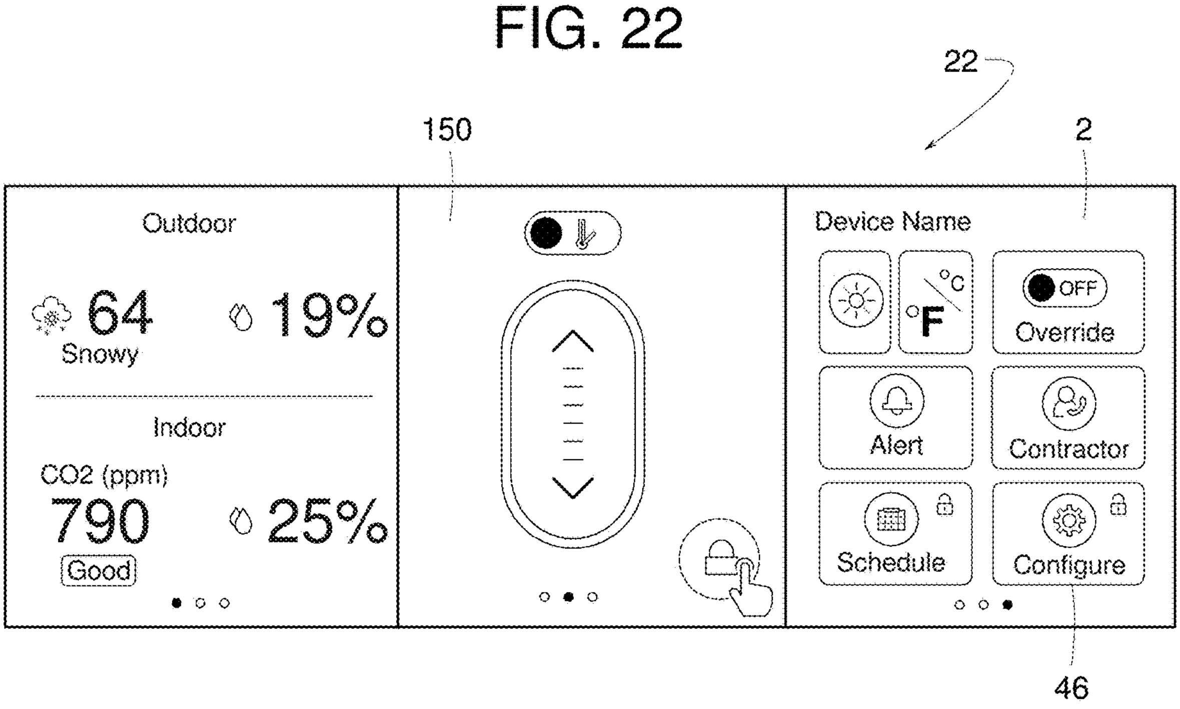
FIG. 22 is a view of another example screen of the thermostat.

When thermostat 30 operates in the default configuration, as shown in screen 4 (FIGS. 4 and 30), thermostat 30 may display a multipage group of screens 21 (FIG. 21). In some examples, the group of screens 21 may include a current conditions page 140, an indoor temperature page 144, and functions page 2. In some examples, current conditions page 140 may display various information about the indoor and outdoor air conditions. In some examples, indoor temperature page 142 may display additional information about the HVAC system's operating mode, the setpoint temperature, and the actual temperature. In some examples, indoor temperature page 142 may also include icons 144 for adjusting the setpoint temperature. In some examples, functions page 2 is substantially the same as screen 2 (FIG. 2). Some examples of multipage group of screen 21 may include a page selection icon 146 for switching among pages 140, 142 and 2.

Figure 3:
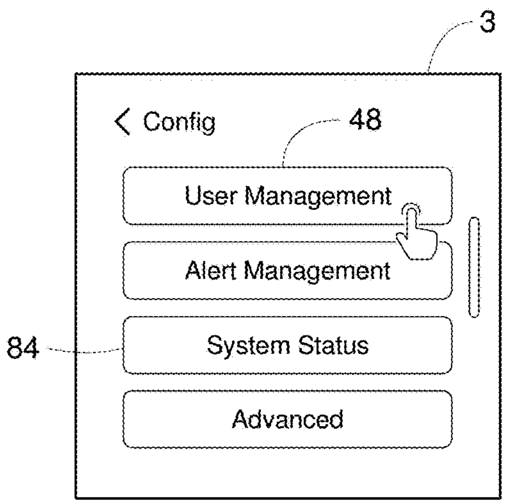
FIG. 3 is a view of another example screen of the thermostat.

When thermostat 30 is set up in the default configuration, as shown in FIG. 4, any user 44 can access and use the multipage group of screen 21, and generally all users 44 are treated as a top tier user 44*a*. In some examples, the only way thermostat 30 can distinguish one user 44 from another is based on which passcode, if any, has been entered. For instance, thermostat 30 may consider bottom tier user 44*d* as being top tier user 44*a* if bottom tier user 44*d* enters top tier passcode 56. So, in the default configuration (FIG. 4), if any user 44 selects Configure button 46 in functions page 2 of FIG. 21 (same as in screen 2 of FIG. 2), thermostat 30 switches to screen 3 (FIG. 3). While in the default configuration, any user 44 can exercise the options in screen 3, including the User Management option 48. As mentioned earlier, User Management option 48 leads to screen 4 where thermostat 30 can be reconfigured to limit access of certain users 44*b*, 44*c*, and/or 44*d*.

Figure 23:
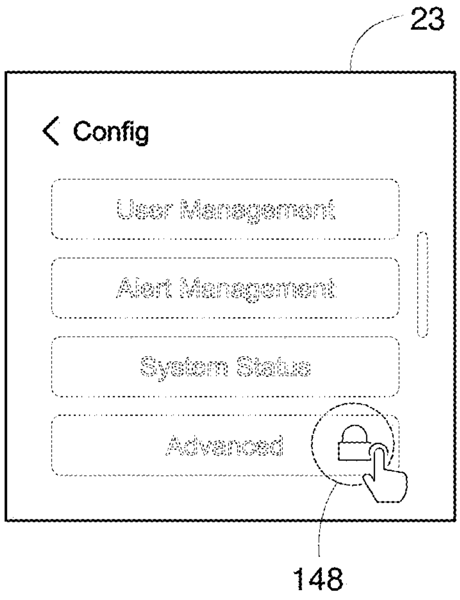
FIG. 23 is a view of another example screen of the thermostat.
Figure 24:
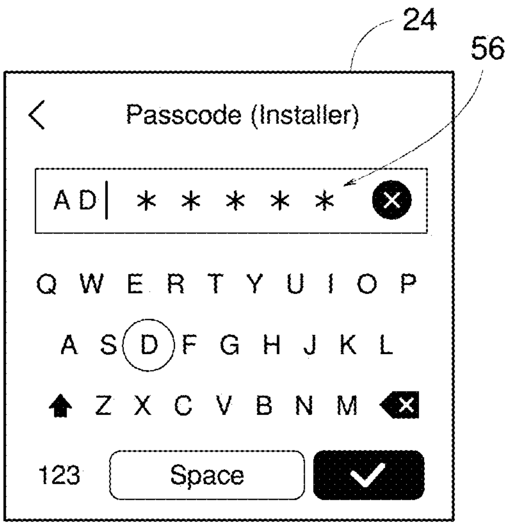
FIG. 24 is a view of another example screen of the thermostat.
Figure 25:
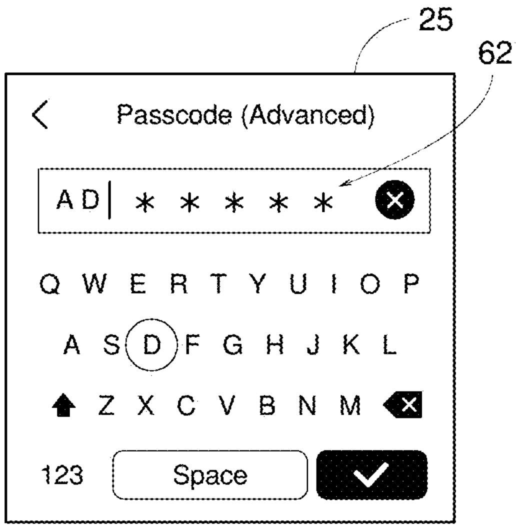
FIG. 25 is a view of another example screen of the thermostat.
Figure 26:
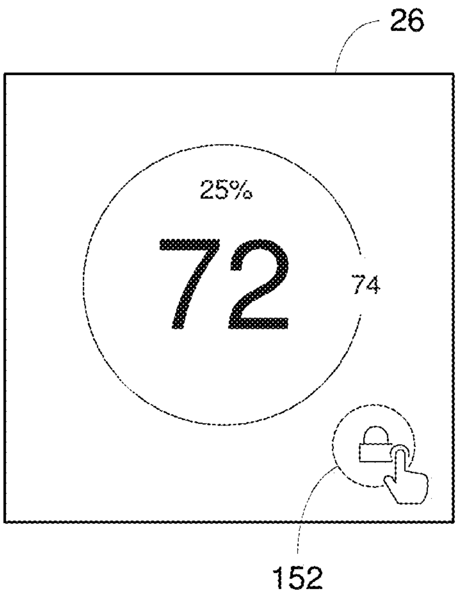
FIG. 26 is a view of another example screen of the thermostat.
Figure 27:
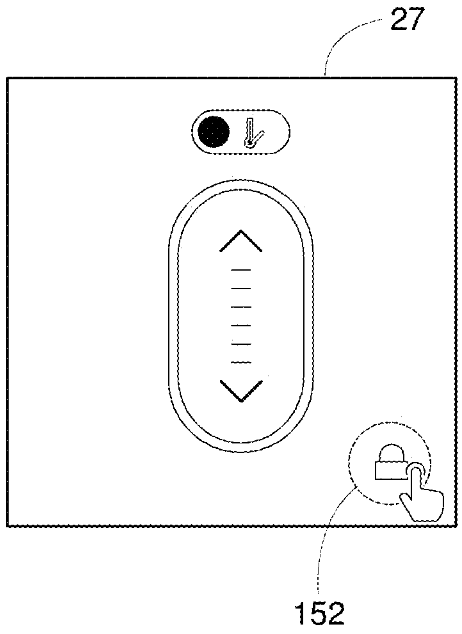
FIG. 27 is a view of another example screen of the thermostat.
Figure 28:
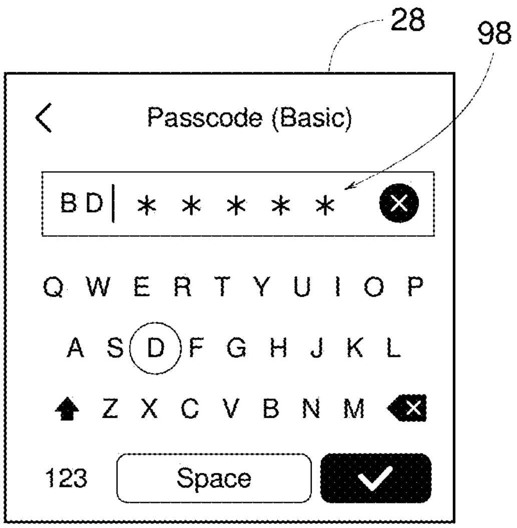
FIG. 28 is a view of another example screen of the thermostat.

When thermostat 30 is set up in the configuration shown in screen 8 (FIGS. 8 and 30), thermostat 30 may display multipage group of screens 21, which in this particular configuration is accessible to any user 44. If a user selects Configure button 46 in functions page 2 of FIG. 21 (same as in screen 2 of FIG. 2), thermostat 30 displays screen 23 (FIG. 23). While operating in the configuration shown in screen 8, options listed in screen 23 are inaccessible until a user 44 (e.g., top tier user 44*a*) enters the correct top tier passcode 56 in screen 24. Screen 24 appears when a user 44 selects an unlock icon 148 in screen 23. Upon entering the correct top tier passcode 56, as specified earlier in screen 10, user 44 is given access to the options shown in screen 3. From there, a user 44 is able to navigate forward to screen 4 where thermostat 30 can be reconfigured.

When thermostat 30 is set up in the configuration shown in screen 7 (FIGS. 7 and 30), thermostat 30 may display either multipage group of screens 21 or an alternate multi-page group of screens 22. The choice of multipage group of screens 21 and 22 and the accessibility to the functions on those screens is determined by the options chosen earlier in screens 13, 16 and 17 during the initial or prior configuration process. A user's choice in screen 17, for instance, determines whether thermostat 30 displays multipage group of screens 21 (standard view button 120) or multipage group of screens 22 (simplified view button 122). Multipage group of screens 21 includes indoor temperature page 142 showing the Standard view (left side option in screen 17). Multipage group of screens 22 includes an alternate indoor temperature page 150 showing the Simplified view (right side option in screen 17).

Once thermostat 30 is set up in the configuration shown in screen 7 (FIGS. 7 and 30), any user 44 can approach and use thermostat 30 without entering a passcode, wherein user 44 will have access to multipage group of screens 21 or 22, depending on the previous selection made in screen 17. Access to various thermostat functions, however, will be limited by the selections that were made earlier in screen 16.

If intermediate upper user **44*b* wants access to more functionality, intermediate upper user 44*b* can select Configure button 46 in screens 21 or 22. This leads to screen 25 where intermediate upper user 44*b* can then enter upper tier passcode 62. In response to entering upper tier passcode 66, intermediate upper user 44*b* is presented with multipage group of screens 22 but with access to additional functionality as specified earlier in screen 13**.

When thermostat 30 is set up in the configuration shown in screen 5 (FIGS. 5 and 30), thermostat 30 may display either one of two basic home screens 26 or 27 (FIGS. 26 and 27), depending on which of home screen 26 or 27 was selected earlier in screens 18, 19 and 20. In some examples, home screen 26 displays the setpoint temperature and actual room temperature but may not enable any user 44 to adjust the setpoint in screen 26 alone. To do so, in some examples, would require user 44 to select an unlock icon 152, which would invite user 44 to enter lower tier passcode 98, upper tier passcode 62 or top tier passcode 56 via screen 28, 25 or 24. In response to entering upper tier passcode 62 in screen 25, intermediate upper user **44*b* is presented with multipage group of screen 22 but with access to additional functionality as specified earlier in screen 13**.

In some examples, instead of home screen 26 being presented to user 44, home screen 27 is displayed. Home screen 27 is presented if top tier user **44*a*, upper tier user 44*b* or lower tier user 44*c* chose that option in screen 20. In some examples, home screen 27 provides user 44*d* with a control to adjust the setpoint temperature but only within predefined limits, e.g., plus or minus three degrees. In some examples, home screen 27 displays neither the setpoint temperature nor the actual room temperature. If user 44 wants access to more thermostat functionality, user 44, in some examples, may select unlock icon 152, which would invite user 44 to enter lower tier passcode 98, upper tier passcode 62 or top tier passcode 56 via screen 28, 25 or 24**.

In response to entering upper tier passcode 62 in screen 25, intermediate upper user **44*b* is presented with multipage group of screen 22 but with access to additional functionality as specified earlier in screen 13. Alternatively, if user 44 enters lower tier passcode 98 in screen 28, intermediate lower user 44*c* is presented with either multipage group of screen 21 or 22, depending on the selections made earlier in screen 17**.

Figure 31:
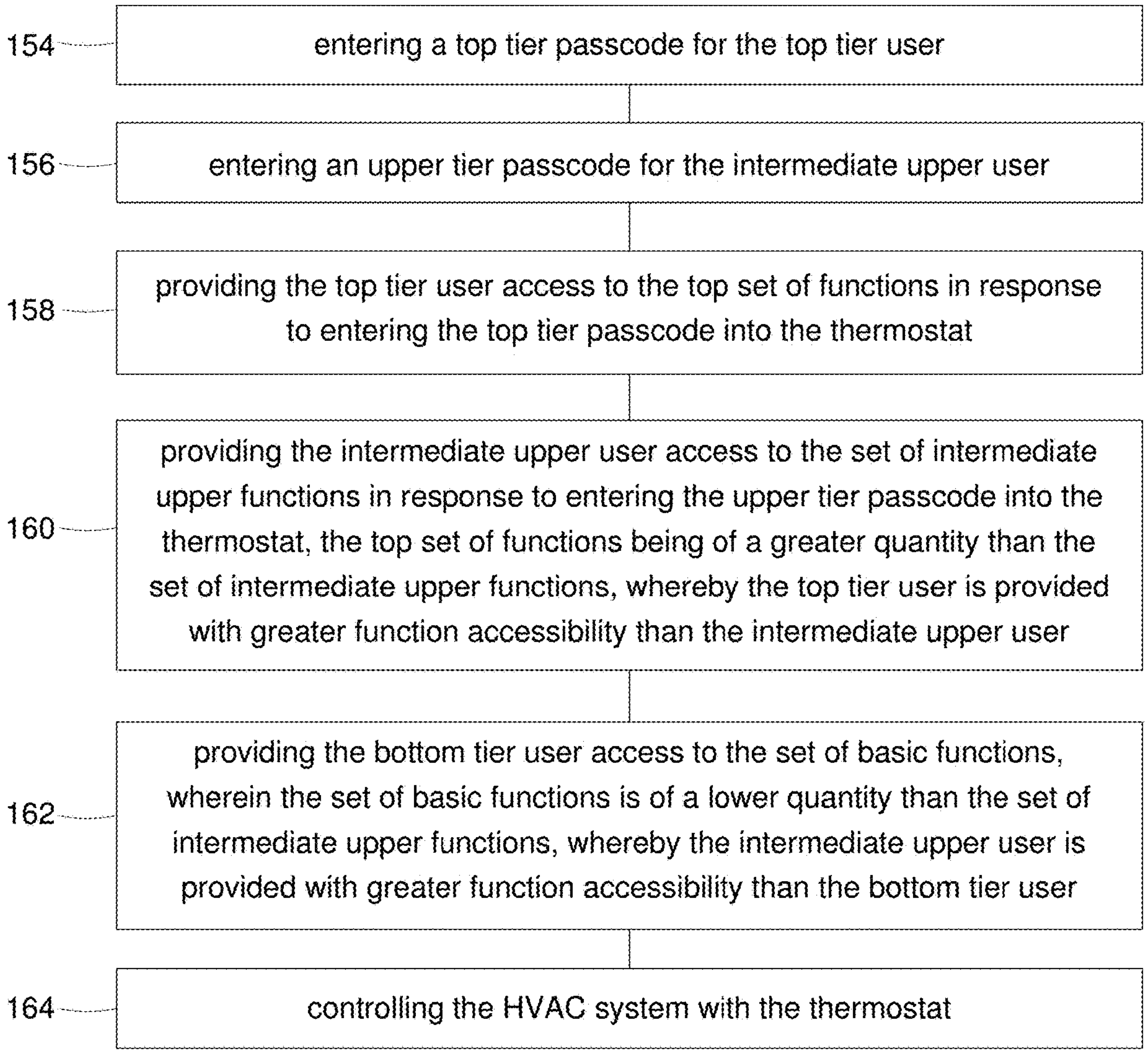
FIG. 31 is a flow diagram illustrating various example method steps associated with some example thermostats.

FIG. 31 is a flow diagram illustrating some example steps of an example method for assisting at least one user 44 in using thermostat 30 for controlling HVAC system 32. In some examples, blocks 154, 156, 158, 160, 162 and 164 may be performed by thermostat 30 and/or user 44.

Figure 32:
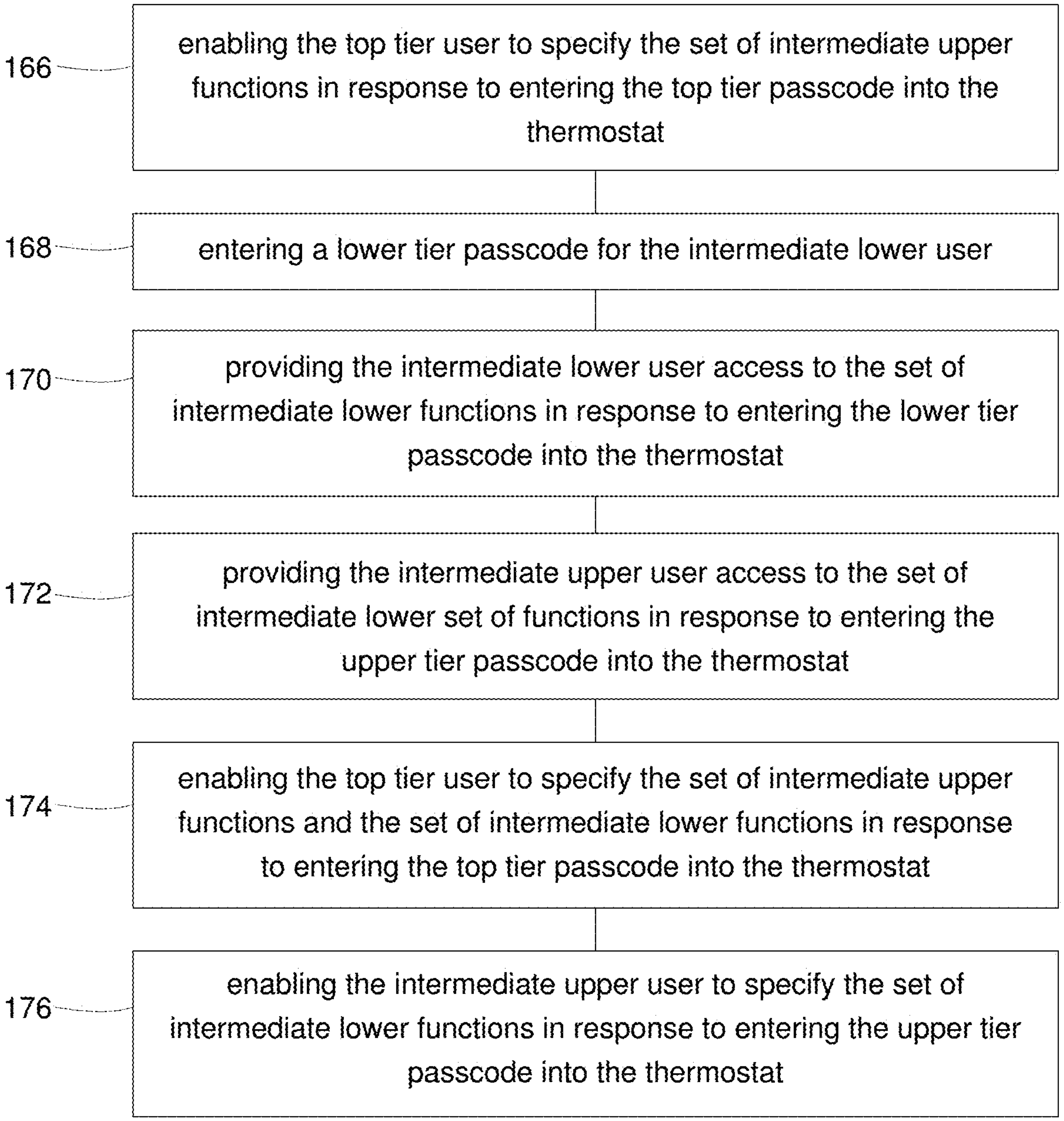
FIG. 32 is a flow diagram illustrating various example method steps associated with some example thermostats.

FIG. 32 is a flow diagram illustrating some example steps of an example method for assisting at least one user 44 in using thermostat 30 for controlling HVAC system 32. In some examples, blocks 166, 168, 170, 172, 174 and 176 may be performed by thermostat 30 and/or user 44.

Figure 33:
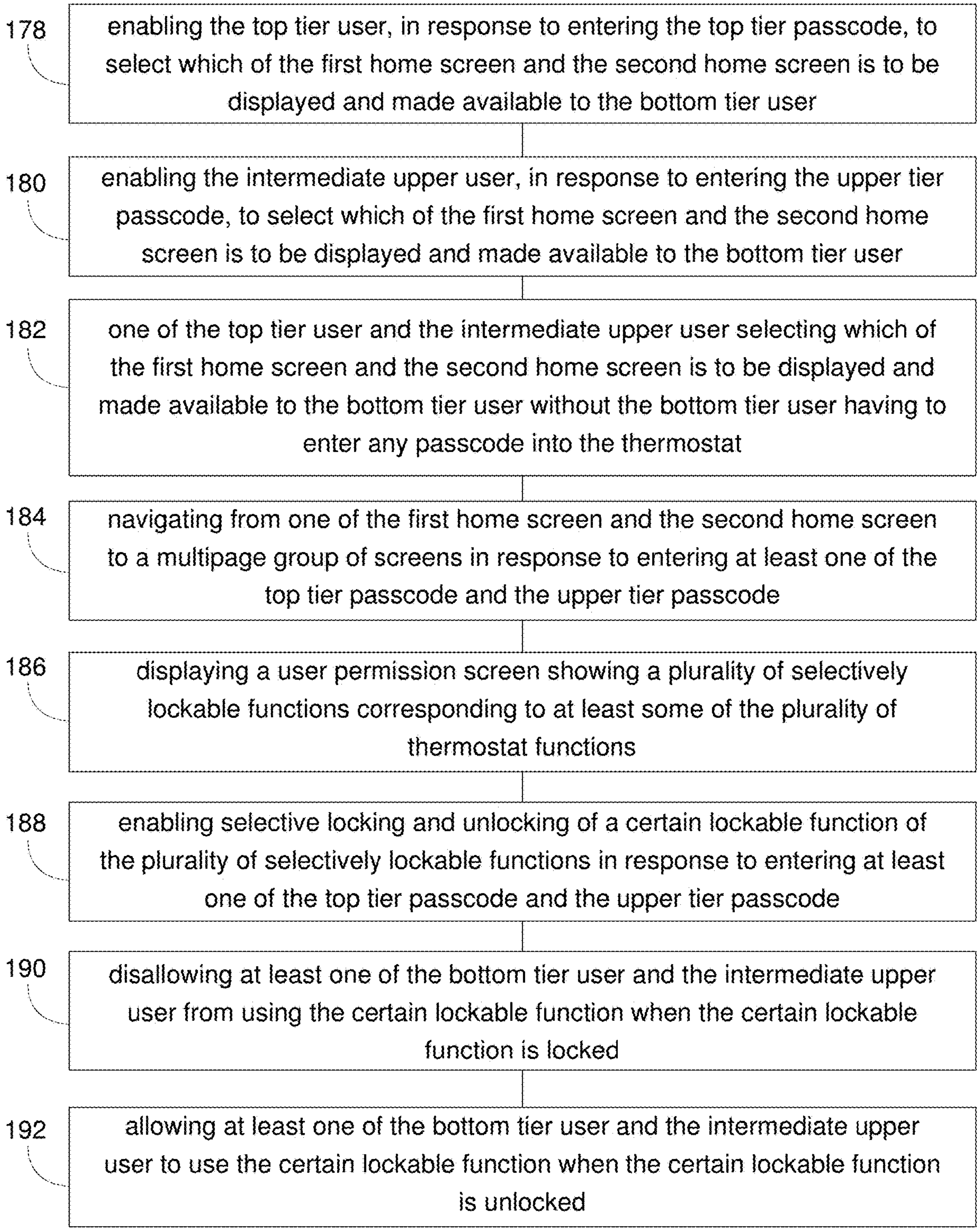
FIG. 33 is a flow diagram illustrating various example method steps associated with some example thermostats.

FIG. 33 is a flow diagram illustrating some example steps of an example method for assisting at least one user 44 in using thermostat 30 for controlling HVAC system 32. In some examples, blocks 178, 180, 182, 184, 186, 188, 190 and 192 may be performed by thermostat 30 and/or user 44.

FIG. 34 is a flow diagram illustrating some example steps of an example method for assisting at least one user 44 in using thermostat 30 for controlling HVAC system 32. In some examples, blocks 194, 196, 198, 200, 202, 204 and 206 may be performed by thermostat 30 and/or user 44.

Figure 35:
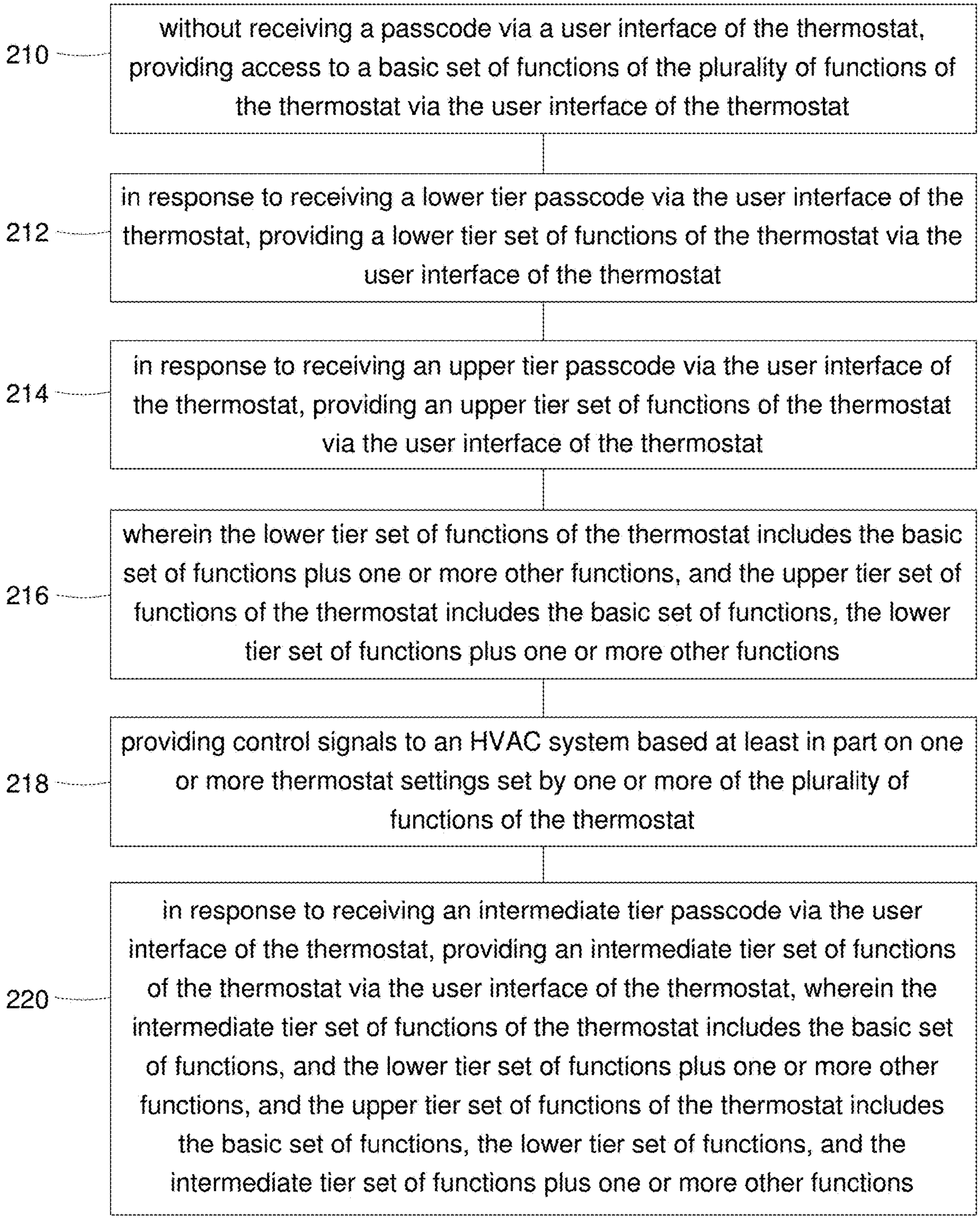
FIG. 35 is a flow diagram illustrating various example method steps associated with some example thermostats.

FIG. 35 is a flow diagram illustrating some example steps of an example method for controlling access to a plurality of functions of thermostat 30. In some examples, blocks 210, 212, 214, 216, 218 and 220 may be performed by thermostat 30 and/or user 44.

In some examples, thermostat 30 may include a housing 222 that includes user interface 36, a controller 224, and a non-transitory computer readable medium 208 that contains instructions or program codes that when executed by thermostat 30 causes thermostat 30 to perform one or more of the method steps shown in FIGS. 31-35. The term, "computer readable medium" refers to any device for storing information for any duration (e.g., for extended time periods, permanently, for brief instances, for temporarily buffering, for caching of the information, etc). The term, "program code" refers to executable instructions (e.g., computer readable instruction, machine readable instructions, software, etc.). The term, "non-transitory computer readable medium" is specifically defined to include any type of computer readable storage device and/or storage disk and to exclude propagating signals and to exclude transmission media.

The disclosure should not be considered limited to the particular examples described above. Various modifications, equivalent processes, as well as numerous structures to which the disclosure can be applicable will be readily apparent to those of skill in the art upon review of the instant specification.

What is claimed is:

1. A method for controlling access to a plurality of functions of a Heating/Ventilating/Air Conditioning (HVAC) thermostat, wherein the thermostat includes a thermostat housing that houses a user interface of the thermostat, the method comprising:

configuring a set of thermostat functions for each one of a plurality of user types based on configuration inputs received from a top tier user, including:

displaying on a display of the user interface of the thermostat a user management screen that displays a plurality of user types;

receiving at the user interface a selection of one of the plurality of user types via the user management screen;

after receiving the selection of the one of the plurality of user types, displaying on the display a permission screen including a listing of one or more thermostat functions that are selectively available for the selected one of the plurality of user types and that are selectively lockable and unlockable;

receiving at the user interface a lock setting or an unlock setting for each individual one of the one or more thermostat functions to allow the selected one of the plurality of user types use of only each of the one or more thermostat functions that are set to the unlocked setting via the permissions screen; and granting, by the thermostat, to one or more users associated with the selected one of the plurality of user types access rights to the one or more thermostat functions selectively available for the selected one of the plurality of user types and that are set to the unlocked stetting.

2. The method of claim 1, comprising:

after the selection of the selected one of the plurality of user types, displaying a passcode screen on the display of the user interface of the thermostat;

receiving a user passcode for the selected one of the plurality of user types via the passcode screen;

after granting the one or more users associated with the selected one of the plurality of user types access rights to the selected one or more thermostat functions, receiving a received passcode via the user interface of the thermostat; and when the received passcode matches the user passcode selected for the selected one of the plurality of user types, providing access to the selected one or more thermostat functions.

3. The method of claim 1, comprising:

after the selection of the selected one of the plurality of user types, displaying a view type screen on the display of the user interface of the thermostat;

receiving a selection of one of a plurality of available home screens via the view type screen for display on the display of the user interface of the thermostat; and for the selected one of the plurality of user types, displaying the selected one of the plurality of available home screens on the display of the user interface of the thermostat, wherein the plurality of available home screens includes a default home screen and a simplified home screen.

4. The method of claim 1, further comprising:

following completion of the configuration of the set of thermostat functions and during subsequent operation of the thermostat, for each individual one of the plurality of user types providing access only to the selected one or more of thermostat functions available to the individual one the user types and that have been set to the unlock setting via the permission screen-while not providing access to any of the one or more thermostat functions that were set to the lock setting via the permissions screen; and providing control signals directly from the thermostat to an HVAC system based at least in part on one or more thermostat settings set by one or more thermostat functions of the thermostat.

5. The method of claim 3, wherein the simplified home screen displays a setpoint temperature and actual room temperature but does not enable the selected one of the plurality of user types to adjust the setpoint temperature of the thermostat.

6. The method of claim 3, wherein the simplified home screen displays an unlock icon, which when selected via the user interface of the thermostat, invites a user to enter a passcode via the user interface of the thermostat to unlock one or more thermostat functions.

7. The method of claim 3, wherein the plurality of available home screens includes a view only home screen.

8. The method of claim 1, wherein the one or more thermostat functions include two or more of:

an alert management function;

a temperature unit function for switching between temperature units of Fahrenheit and Centigrade;

a schedule function for setting or changing a programmable schedule of the thermostat;

a lockable thermostat function for changing one or more locking conditions for the user interface of the thermostat;

a basic configuration function for changing one or more basic configuration settings of the thermostat;

a permission management function for managing permissions for the plurality of one or more thermostat functions of the thermostat;

a change home screen function to change a home screen that is displayed on the display of the user interface of the thermostat; and a change setpoint function for changing a setpoint of the thermostat.

9. The method of claim 1, comprising:

verifying reception of valid passcode via the user interface of the thermostat before displaying on the display of the user interface of the thermostat the user management screen that displays the plurality of user types.

10. A Heating/Ventilating/Air Conditioning (HVAC) thermostat comprising:

a user interface including a display;

a controller;

a thermostat housing that houses the user interface and the controller;

the controller is configured to:

configure a set of thermostat functions for each one of a plurality of user types based on configuration inputs received from a top tier user, including to:

display on the display of the user interface of the thermostat a user management screen that displays a plurality of user types;

receive via the user interface a selection of a selected one of the plurality of user types via the user management screen;

after receiving the selection of the selected one of the plurality of user types, display a permissions screen on the display of the user interface that displays a listing of one or more thermostat functions of the thermostat that are selectively available for the selected one of the plurality of user types and that are selectively lockable and unlockable;

receive a lock setting or an unlock setting for each individual one of the one or more thermostat functions to allow the selected one of the plurality of user types use of only each of the one or more thermostat functions that are set to the unlocked setting; and grant to one or more users associated with the selected one of the plurality of user types access rights to the one or more thermostat functions selectively available for the selected one of the plurality of user types and that are set to the unlocked stetting.

11. The thermostat of claim 10, wherein the controller is configured to:

after the selection of the selected one of the plurality of user types, display a passcode screen on the display of the user interface of the thermostat;

receive via the user interface a user passcode for the selected one of the plurality of user types via the passcode screen;

after granting the one or more users associated with the selected one of the plurality of user types access rights to the selected one or more thermostat functions, receive via the user interface a received passcode via the user interface of the thermostat; and when the received passcode matches the user passcode selected for the selected one of the plurality of user types, provide access to the selected one or more thermostat functions.

12. The thermostat of claim 10, wherein the controller is configured to:

after the selection of the selected one of the plurality of user types, display a view type screen on the display of the user interface of the thermostat;

receive via the user interface a selected one of a plurality of available home screens via the view type screen for display on the display of the user interface of the thermostat; and for the selected one of the plurality of user types, displaying the selected one of the plurality of available home screens on the display of the user interface of the thermostat, wherein the plurality of available home screens includes a default home screen and a simplified home screen.

13. The thermostat of claim 10, wherein following completion of the configuration of the set of thermostat functions and during subsequent operation of the thermostat the controller is configured to:

for each individual one of the plurality of user types providing access only to the selected one or thermostat functions available to the individual one the user types and that have been set to the unlock setting via the permission screen-while not providing access to any of the one or more thermostat functions that were set to the lock setting via the permissions screen.

14. The thermostat of claim 12, wherein the simplified home screen displays a setpoint temperature and actual room temperature but does not enable the selected one of the plurality of user types to adjust the setpoint temperature.

15. The thermostat of claim 12, wherein the simplified home screen displays an unlock icon, which when selected via the user interface of the thermostat, the controller is configured to invite a user to enter a passcode via the user interface of the thermostat to unlock one or more thermostat functions.

16. The thermostat of claim 12, wherein the plurality of available home screens includes a view only home screen.

17. The thermostat of claim 10, wherein the one or more thermostat functions include two or more of:

an alert management function;

a temperature unit function for switching between temperature units of Fahrenheit and Centigrade;

a schedule function for setting or changing a programmable schedule of the thermostat;

a lockable thermostat function for changing one or more locking conditions for the user interface of the thermostat;

a basic configuration function for changing one or more basic configuration settings of the thermostat;

a permission management function for managing permissions for the plurality of one or more thermostat functions of the thermostat;

a change home screen function to change a home screen that is displayed on the display of the user interface of the thermostat; and a change setpoint function for changing a setpoint of the thermostat.

18. The thermostat of claim 12, wherein the controller is configured to:

verify reception of a top tier passcode via the user interface of the thermostat before displaying on the display of the user interface of the thermostat the user management screen that displays the plurality of user types.

19. A non-transitory computer readable medium storing instructions thereon that when executed by one or more processors of a thermostat causes the one or more processors to:

configure a set of Heating/Ventilating/Air Conditioning (HVAC) thermostat functions for each one of a plurality of user types based on configuration inputs received from a top tier user, including to:

display on the display of the user interface of the thermostat a user management screen that displays a plurality of user types;

receive via the user interface a selection of a selected one of the plurality of user types via the user management screen;

after receiving the selection of the selected one of the plurality of user types, display a permissions screen on the display of the user interface that displays a listing of one or more thermostat functions of the thermostat that are selectively available for the selected one of the plurality of user types and that are selectively lockable and unlockable;

receive a lock setting or an unlock setting for each individual one of the one or more thermostat functions to allow the selected one of the plurality of user types use of only each of the one or more thermostat functions that are set to the unlocked setting via the permissions screen; and grant to one or more users associated with the selected one of the plurality of user types access rights to the one or more thermostat functions selectively available for the selected one of the plurality of user types and that are set to the unlocked stetting;

during subsequent operation of the thermostat, and for the selected one of the plurality of user types, provide access to the selected one or more thermostat functions via the user interface while not providing access to the one or more thermostat functions that were not selected for the selected one of the plurality of user types via the permissions screen; and provide control signals directly from the thermostat to an HVAC system based at least in part on one or more thermostat settings set by one or more thermostat functions of the thermostat.

20. The non-transitory computer readable medium of claim 19, wherein the instructions cause the one or more processors of the thermostat to:

after the selection of the selected one of the plurality of user types, display a passcode screen on the display of the user interface of the thermostat;

receive via the user interface a user passcode for the selected one of the plurality of user types via the passcode screen;

after granting the one or more users associated with the selected one of the plurality of user types access rights to the selected one or more thermostat functions, receive via the user interface a received passcode via the user interface of the thermostat; and when the received passcode matches the user passcode selected for the selected one of the plurality of user types, provide access to the selected one or more thermostat functions.

* * * * *